US008125578B2

(12) United States Patent  (10) Patent No.: US 8,125,578 B2
Choi  (45) Date of Patent: Feb. 28, 2012

(54) TABLE TYPE BI-DIRECTIONAL IMAGING APPARATUS

(76) Inventor: Hae-Yong Choi, Seoul (KR)

( * ) Notice: Subject to any disclaimer, the term of this patent is extended or adjusted under 35 U.S.C. 154(b) by 1289 days.

(21) Appl. No.: 11/798,966

(22) Filed: May 18, 2007

(65) Prior Publication Data

US 2008/0239172 A1  Oct. 2, 2008

(30) Foreign Application Priority Data

Mar. 27, 2007 (KR) .......................... 10-2007-0030657

(51) Int. Cl.
*H04N 5/72* (2006.01)
(52) U.S. Cl. ............................... 348/840; 348/40; 348/41
(58) Field of Classification Search .......... 348/836–842, 348/40, 41; 463/16, 46
See application file for complete search history.

(56) References Cited

U.S. PATENT DOCUMENTS

| | | | | |
|---|---|---|---|---|
| 5,159,549 | A * | 10/1992 | Hallman et al. ................. | 463/26 |
| 7,306,516 | B2 * | 12/2007 | Iosilevsky ....................... | 463/13 |
| 2005/0049049 | A1 * | 3/2005 | Griswold et al. ............... | 463/46 |
| 2005/0243427 | A1 * | 11/2005 | Choi ............................. | 359/599 |
| 2006/0068871 | A1 * | 3/2006 | Crawford et al. .............. | 463/13 |
| 2006/0068899 | A1 * | 3/2006 | White et al. .................... | 463/25 |
| 2006/0177109 | A1 * | 8/2006 | Storch ........................... | 382/118 |
| 2007/0060262 | A1 * | 3/2007 | Kosaka et al. .................. | 463/16 |
| 2007/0072682 | A1 * | 3/2007 | Crawford et al. .............. | 463/46 |

\* cited by examiner

*Primary Examiner* — Eileen D Lillis
*Assistant Examiner* — Alp Akbasli
(74) *Attorney, Agent, or Firm* — Bacon & Thomas, PLLC

(57) ABSTRACT

Disclosed is a table type bi-directional imaging apparatus, in which left and right viewers located at left and right sides simultaneously view the same picture or different pictures. The table type bi-directional imaging apparatus includes a table case having a table shape; a transparent window formed through the center of the upper surface of the table case; and left and right projectors and left and right imaging plates, having a screen structure, bilaterally symmetrically installed at left and right sides of the inside of the table case. In the table type bi-directional imaging apparatus, left and right projection distances to project pictures on large-sized screens and left and right viewing distances to view clear pictures are provided within an occupation area of a single table. Further, the imaging apparatus has a table structure, and thus does not require the occupation area of a separate table, thereby minimizing an area for installing the imaging apparatus.

1 Claim, 2 Drawing Sheets

TABLE TYPE BI-DIRECTIONAL IMAGING APPARATUS

BACKGROUND OF THE INVENTION

1. Field of the Invention

The present invention relates to an imaging apparatus, and more particularly to a table type bi-directional imaging apparatus, which allows viewers at both left and right sides of the imaging apparatus to view the same picture or different pictures simultaneously.

2. Description of the Related Art

Conventional imaging apparatuses do not consist of separate unit devices and thus cannot provide separate pictures to individuals in a business place owing to securing of an occupation area of the imaging apparatus, an occupation area of a table, a projection distance of a projector, or a proper viewing distance, but only provide a single picture simultaneously to many people.

However, an imaging apparatus, such as a DVD or a game apparatus, in which individuals at tables selectively view pictures according to their taste in a business place, such as a fast-food restaurant, a cafeteria, and a sports bar, has been required.

In a restricted business place, the more tables installed, the more income increased. Accordingly, the smaller the volume of the imaging apparatus, the more the number of tables becomes, and the larger the size of a screen in the imaging apparatus, the higher the response of customers. Further, the imaging apparatus requires viewers at both left and right sides (or both front and rear sides) thereof to view pictures simultaneously.

In order to clearly view the above pictures of screens, viewers must view the picture at reasonably long distances. Thus, an occupation area of the imaging apparatus due to the viewing distances may be increased.

SUMMARY OF THE INVENTION

Therefore, the present invention has been made in view of the above problems, and it is an object of the present invention to provide a table type bi-directional imaging apparatus, in which viewers at both left and right sides view the same picture or different pictures simultaneously, and in which viewing distances and projection distances are provided in the minimum area, an occupation area of the apparatus is minimized, and sufficient viewing distances and large-sized screens are obtained.

In accordance with the present invention, the above and other objects can be accomplished by the provision of a table type bi-directional imaging apparatus comprising a table case having a table shape; a transparent window formed through the center of the upper surface of the table case; and left and right projectors and left and right imaging plates, having a screen structure, bilaterally symmetrically installed at left and right sides of the inside of the table case, wherein a left viewer downwardly watches the right imaging plate and a right viewer downwardly watches the left imaging plate such that pictures displayed on the left and right imaging plates can be cross-viewed by the left and right viewers bi-directionally.

Each of the left and right imaging plates may be a reflective screen having a screen gain of 2 or more.

Each of the left and right imaging plates may be a spherical screen having a screen gain of 10 or more.

Each of the left and right imaging plates may be a flat imaging plate selected from the group consisting of an LCD and a PDP.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the annexed drawings.

Figure 1:
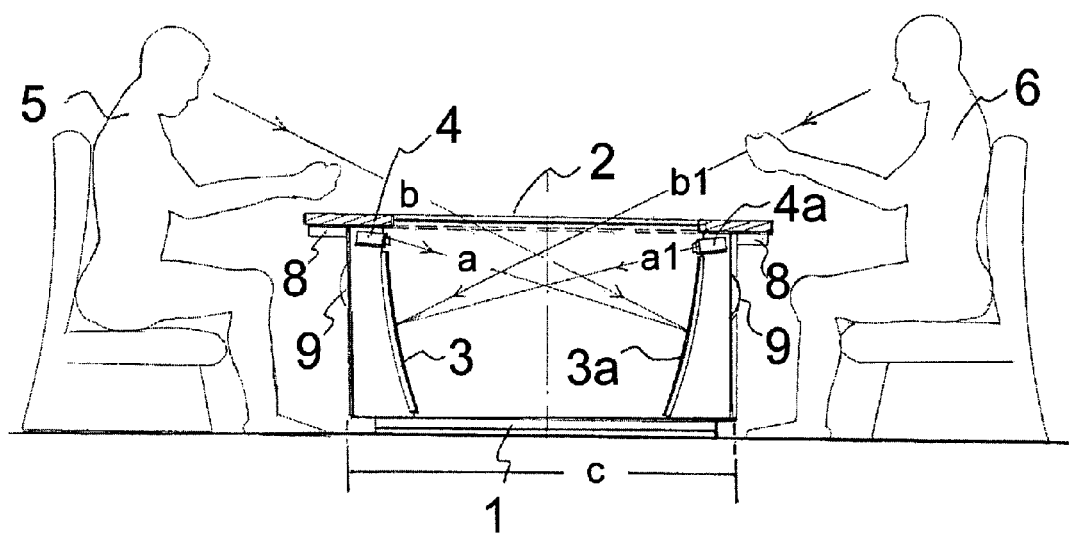
FIG. 1 is a schematic view of a table type bi-directional imaging apparatus in accordance with the present invention.
Figure 2:
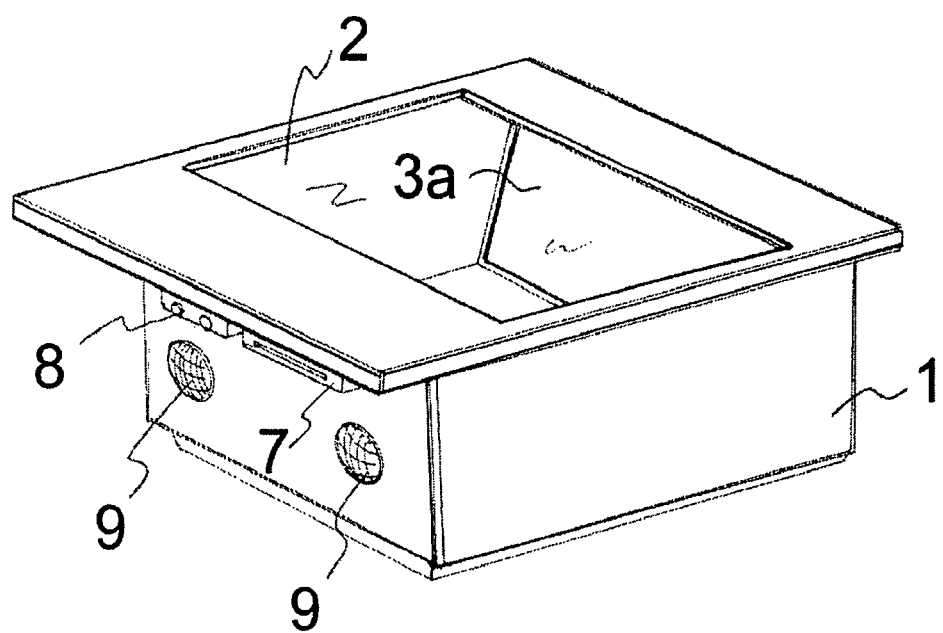
FIG. 2 is a perspective view of the table type bi-directional imaging apparatus in accordance with the present invention.

With reference to FIGS. 1 and 2, in a table type bi-directional imaging apparatus, a transparent window 2 made of glass or plastic is formed through the center of the upper surface of a table case 1 having a table shape.

A left projector 4 is installed at the upper end of the left side of the inside of the table case 1, and a left imaging plate 3 is installed on the left side of the inside of the table case 1 below the left projector 4.

A right projector 4a is installed at the upper end of the right side of the inside of the table case 1, and a right imaging plate 3a is installed on the right side of the inside of the table case 1 below the right projector 4a.

That is, the above left and right imaging structures are bilaterally symmetrical centering on the center of the table case 1.

A left viewer 5 is located at the left side of the table case 1 and a right viewer 6 is located at the right side of the table case 1.

As shown in FIG. 2, speakers 9, an image output device 7, such as a DVD or a set-top box, and an amplifier 8 for amplifying a sound are installed at both or either of the left and right side surfaces of the lower end of the table case 1. Further, various game devices 7a may be installed at both or either of the left and right sides of the lower end of the table case 1.

In FIG. 1, reference numeral 'a' represents a projection distance from the left projector 4 to the right imaging plate 3a (hereinafter, referred to as a "left projection distance"), and reference numeral 'a1' represents a projection distance from the right projector 4a to the left imaging plate 3 (hereinafter, referred to as a "right projection distance").

Reference numeral 'b' represents a viewing distance from the right imaging plate 3a to the left viewer 5 (hereinafter, referred to as a "left viewing distance"), and reference numeral 'b1' represents a viewing distance from the left imaging plate 3 to the right viewer 6 (hereinafter, referred to as a "right viewing distance").

Reference numeral 'c' represents a length of the occupation area of the table case 1.

The left imaging plate 3 and the right imaging plate 3a are composed of a screen with a reflective surface having a screen gain of 2 or more, thus having a brightness twice or more than that of a conventional screen.

When the left imaging plate 3 and the right imaging plate 3a are composed of a spherical screen, the left imaging plate 3 and the right imaging plate 3a have a screen gain up to approximately 30, thus having a brightness up to 30 times that of the conventional screen.

Here, focal distances of the spherical left and right imaging plates 3 and 3a due to curvature must be the same as the left and right projection distances (a, a1) of the left and right projectors 4 and 4a.

The left imaging plate 3 and the right imaging plate 3a may be composed of a flat imaging plate, which displays a picture by a flat screen, such as an LCD monitor or a PDP monitor.

As described above, the table type bi-directional imaging apparatus of the present invention has a structure that the left and right viewers 5 and 6 located at the left and right sides of the table case 1 opposite to each other can simultaneously view the same picture or different pictures according to their taste.

That is, the left viewer 5 views a picture, which is projected on the right imaging plate 3a by the left projector 4, at a distance as long as the left viewing distance (b), and the right viewer 6 views a picture, which is projected on the left imaging plate 3 by the right projector 4a, at a distance as long as the right viewing distance (b1).

Since the left viewer 5 is separated from the right imaging plate 3a at a distance as long as the left viewing distance (b), the left viewer 5 views a clear picture and secures the projection distance (a) of the left projector 4 simultaneously.

Further, in the same manner, the right viewer 6 secures the right viewing distance (b1) and the right projection distance (a1) simultaneously.

That is, the table type bi-directional imaging apparatus of the present invention satisfies the requirements that viewers are separated from a screen by a viewing distance at least twice or three times as long as the length of the screen so as to view a clear picture.

The left projector 4 makes the left projection distance (a) and the left viewing distance (b) to intersect the right projection distance (a1) and the right viewing distance (b1), and the right projector 4a makes the right projection distance (a1) and the right viewing distance (b1) to intersect the left projection distance (a) and the left viewing distance (b). Thereby, all optical elements are provided in the occupation area of the table case 1.

That is, since the left and right projection distances (a, a1) and the left and right viewing distances (b, b1) are assured within the length (c) of the occupation area of the table case 1, as shown in FIG. 1, the table type bi-directional imaging apparatus of the present invention reduces an occupation area up to a half to a quarter that of a conventional imaging apparatus, and assures the maximum projection distances and the maximum viewing distances at both left and right sides thereof.

Since the length (c) the occupation area of the table case 1 is substantially 0.6~1 m, a picture can be projected on a screen having a size up to 24"~60" within the range of the left and right projection distances (a, a1) permissible in the above length (c) of the occupation area of the table case 1. Thereby, viewers can watch large-sized screens and ensure sufficient viewing distances (0.6~1 m).

Further, the table type bi-directional imaging apparatus of the present invention serves as a table, thus not requiring a separate table. Accordingly, the left and right projection distances and the left and right viewing distances are provided in a single table, and viewers at both left and right sides of the table simultaneously watch the left and right imaging plates.

The table type bi-directional imaging apparatus of the present invention is advantageous in that the left and right viewers 5 and 6 sat at the left and right sides of the table case 1 can simultaneously view the same picture or view different pictures using the image output device 7, such as a DVD and a set-top box, as shown in FIG. 2 (in this case, a headphone is used to hear a sound). Further, the table type bi-directional imaging apparatus of the present invention is advantageous in that the left and right viewers 5 and 6 can simultaneously play the same game or play different games, when the present invention is applied to a game apparatus, or can play a match in a sports game.

Moreover, the table type bi-directional imaging apparatus of the present invention may be applied to picture viewing by a doctor to a patient in a hospital, picture briefing to customers at an information desk of a company or a government and public office, one-to-one conversations for English teaching, and so on.

As apparent from the above description, the present invention provides a table type bi-directional imaging apparatus, in which left and right viewers located at left and right sides simultaneously view a single picture or selected different pictures having a brightness at least twice as high as that of a conventional imaging apparatus at sufficient left and right viewing distances.

Further, the table type bi-directional imaging apparatus of the present invention has an occupation area reduced up to a half to a quarter that of a conventional imaging apparatus. Particularly, the table type bi-directional imaging apparatus of the present invention is applied to a game apparatus, in which people located at left and right sides simultaneously enjoy a game, an audio-visual education system, and a video information system, and is practically used in a cafeteria, a sports bar, a game shop, and a government and public office.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A table type bi-directional imaging apparatus comprising:
    a table case having a table shape including a front end, a rear end, and an upper surface;
    a transparent window formed in a center of the upper surface of the table case;
    at least two projectors bilaterally and symmetrically installed beneath the upper surface of the table case, wherein a first one of the projectors is installed towards the front end and a second one of the projectors is installed at the rear end of the table case; and
    at least two imaging plates bilaterally and symmetrically installed beneath the upper surface of the table case, wherein a first imaging plate is positioned at the front end and a second imaging plate is positioned at the rear end of the table case,
    wherein the first imaging plate is arranged to receive and display an image projected from the second projector and the second imaging plate is arranged to receive and display an image projected from the first projector in a way such that the images are bi-directionally viewable on the at least two imaging plates through the transparent window from above the table.

* * * * *